Aug. 9, 1966   E. F. WEBB   3,265,845
CONTROL ASSEMBLY FOR WINDSHIELD CLEARING SYSTEM
Filed May 18, 1964   2 Sheets-Sheet 1

INVENTOR
EDMOND F. WEBB
BY Rudolph L. Lowell
ATTORNEY

Aug. 9, 1966 E. F. WEBB 3,265,845
CONTROL ASSEMBLY FOR WINDSHIELD CLEARING SYSTEM
Filed May 18, 1964 2 Sheets-Sheet 2

INVENTOR
EDMOND F. WEBB
BY
ATTORNEY

United States Patent Office 3,265,845
Patented August 9, 1966

1

3,265,845
CONTROL ASSEMBLY FOR WINDSHIELD CLEARING SYSTEM
Edmond F. Webb, Franklin, Mich., assignor to The Delman Company, Cookeville, Tenn., a corporation of Tennessee
Filed May 18, 1964, Ser. No. 367,943
3 Claims. (Cl. 200—152)

This invention relates to windshield clearing systems having electric motor operated wiper and washer units and more particularly to a control assembly for the selective operation of the wiper unit and washer unit.

It is the object of this invention to provide an improved control means for a windshield clearing system employing an electric motor operated wiper unit and an electric motor operated washer unit.

Another object of the invention is to provide an electric switch having at least one body of mercury employed for the purpose of making or breaking contact with electric terminals.

A further object of the invention is to provide a multi-circuit mercury switch for selectively controlling the direction and speed of rotation of the armature of a windshield wiper electric motor.

Still another object of the invention is to provide in an electric circuit for an electric windshield wiper motor, a mercury switch which is not sensitive to road shock or the grade which the vehicle may be ascending or descending.

An additional object of this invention is to provide a compact control assembly for selectively operating an electric wiper motor and an electric washer motor, which is sturdy in construction, economical in cost and installation, and reliable in operation.

These and other objects will be apparent from reference to the following description and the accompanying drawing, wherein.

Figure 1:
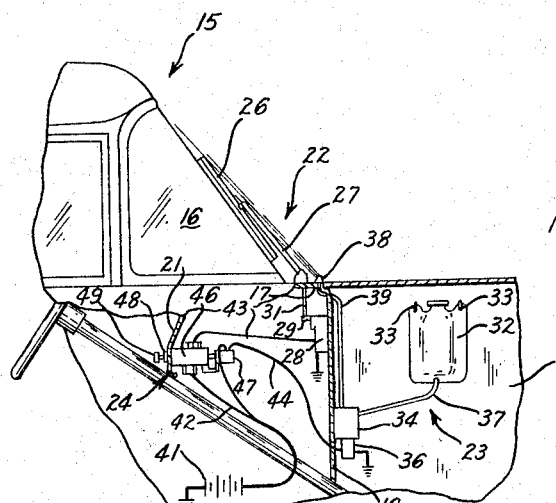
FIG. 1 is a fragmentary view of a vehicle equipped with a windshield wiper and washer system having a control assembly constructed according to the invention.

Referring to the drawing, there is shown in FIG. 1 a windshield clearing system in assembled relation with a vehicle indicated generally by the reference numeral 15 and illustrated in fragmentary form. The vehicle 15 is an automobile having an upwardly and rearwardly projected windshield 16. A cowl 17 extends forwardly from the lower front edge of the windshield 16 and joins with an upright fire wall 18 and an upright side wall 19. The

2 automobile is further equipped with an instrument panel or dashboard 21 positioned rearwardly of the windshield 16 in the passenger compartment.

The windshield clearing system includes a windshield wiper unit and a windshield washer unit designated generally as 22 and 23, respectively. A control assembly indicated generally at 24 is mounted on the dashboard 21 and functions to regulate the operation of the wiper unit 22 and the washer unit 23.

The wiper unit 22 comprises a pair of wiper elements 26 (one of which is shown) held in engagement with the outside surface of the windshield 16 by arms 27 mounted on the cowl 17. An electric motor 28 is mounted on the fire wall 18 below the cowl 17 and has a drive shaft 29 connected to the arms 27 by a motion transmitting linkage 31. Energization of the electric motor 28 moves the linkage 31 in a reciprocating path which in turn oscillates the arms 27 and the associated wiper elements 26 with respect to the windshield 16. Reverse operation of the electric motor 28 moves the wiper elements 26 to a park position along the surface of the cowl 17 and off the windshield 16. The detailed operation of the electric motor 28 will be described hereinafter.

The windshield washer unit 23 includes a liquid container or reservoir 32 mounted on the side wall 19 by a pair of brackets 33. Secured to the fire wall 18 below the level of the reservoir 32 is a gear pump 34 connected in a driving relation to an electric motor 36. The inlet of the pump 34 is connected to the bottom of the reservoir 32 by a hose 37. The pump 34 is positioned below the level of the reservoir 32 to keep it in a primed condition. Energization of the electric motor 36 operates the pump 34 which discharges cleaning liquid under pressure to nozzles 38 (one of which is shown) mounted on the cowl 17. A flexible rubber hose 39 connects the discharge portion of the pump 34 with the inlet section of the nozzles 38.

The control assembly 24 is operable to selectively connect and disconnect the wiper electric motor 28 and the washer electric motor 36 with the battery 41. A line 42 electrically couples the battery 41 with the control assembly 24. From the control assembly 24, lines 43 and 44 complete the electrical circuit to the motors 28 and 36, respectively.

Figure 2:
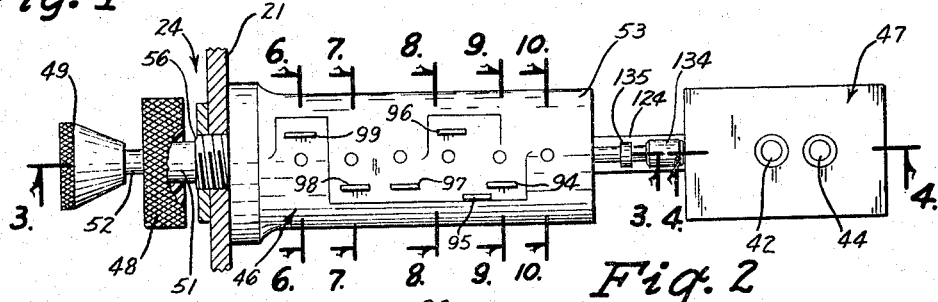
FIG. 2 is an enlarged plan view of the control assembly of FIG. 1.

As shown in FIGS. 1 and 2, the control assembly 24 comprises a first switch unit 46 and a second switch unit 47. The first switch unit 46 is secured to and projects forwardly from the dashboard 21. The second switch unit 47 is fastened to and is in axial alignment with the first switch unit 46.

The switch units 46 and 47 are separately controlled by the operator of the vehicle by the independent movement of buttons 48 and 49, respectively. The buttons are mounted adjacent the dashboard 21 and are within the reach of the operator of the vehicle. As shown in FIG. 2, the button 48 is mounted on a rotatable tubular shaft 51. Extended axially through the tubular shaft 51 is a rod 52 for carrying the button 49. Rotation of the tubular shaft 51 actuates the first switch unit 46 which in turn connects the wiper electric motor 28 with the battery 41. Linear movemen of the rod 52 actuates the second switch 47 to connect the washer electric motor 36 to the battery 41.

Figure 3:
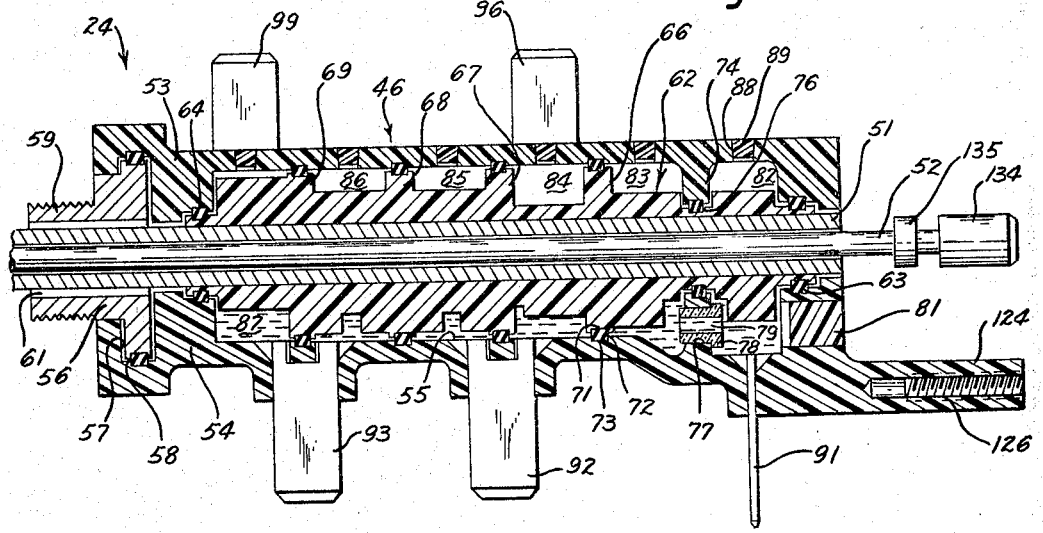
FIG. 3 is an enlarged sectional view taken along the line 3—3 of FIG. 2.

Referring to FIG. 3, the first switch unit 46 comprises an upper housing section 53 and a lower housing section 54 made from electrically insulative plastic material. Housing sections 53 and 54 are heat sealed together to form a unitary casing having a longitudinally extended bore 55. A metal insert 56 is seated in an undercut recess 57 in one end of the housing sections 53 and 54. An annular seal 58 of resilient material is seated in the peripheral wall of the recess 57 and engages the metal insert 56. The seal 58 provides a resilient mount for the insert 56 reducing the stresses on the housing sections 53 and 54. The insert 56 has a body section 59 projected axially away from the housing sections 53 and 54. The peripheral surface of the body section 59 has external threads which cooperate with a nut (not shown) to secure the entire control assembly 24 on the dashboard 21. A bore 61 extends axially through the insert 56 and is of a diameter to accommodate the tubular shaft 51.

Positioned in the longitudinal bore 55 defined by the assembled housing sections 53 and 54 is a rotor or sleeve indicated generally as 62. The sleeve 62 is mounted on the tubular shaft 51 and is rotatable therewith. The opposite ends of the sleeve 62 are of a reduced diameter and carry seals 63 and 64 which cooperate with the opposite end sections of the housing sections 53 and 54 to close the bore 55 formed thereby. The sleeve 62 has four longitudinally spaced annular ribs or walls 66, 67, 68, and 69. Each of these walls has a bearing groove 71 for receiving an annular seal 72. The inner peripheral walls of the bore 55 adjacent the ribs 66, 67, 68, and 69 have grooves 73 for receiving the annular seals 72.

The forward portions of the housing sections 53 and 54 have an inwardly directed annular wall 74 extended into an annular groove formed in the sleeve 62. An annular seal 76 is positioned in engagement with the annular end of the wall 74 and the adjacent portion of the sleeve 62.

The lower portion of the annular wall 74 has a longitudinally extended hole 77. A tubular member 78 of electrically insulative ceramic material is positively positioned in the hole 77. The tubular member 78 has a small longitudinally extended bore 79 providing a fluid passage through the wall 74. The forward end wall of the housing section 54 has a removable plug 81 in alignment with the tubular member 78. The plug 81 closes a passage in the housing section 54 which is used in the assembly of the tubular member 78 to a tight fit relationship with the circular surface of the wall 74 forming the hole 77.

The annular walls 66, 67, 68, and 69 of the sleeve 62 and the annular wall 74 of the housing sections 53 and 54 divide the longitudinal bore 55 formed by the housing sections 53 and 54 into separate and substantially equal liquid confining chambers 82, 83, 84, 85, 86, and 87. The upper housing section 53 has a plurality of longitudinally spaced holes 88 which open into each of the chambers to form passages through which electric current conducting liquid, such as mercury, may be placed in the respective chambers. After the liquid has been placed in the chambers, plugs 89 are set in the holes 88 to close the openings to the respective chambers.

As shown in FIG. 3, an electrical conductor or electrode 91 is positioned in the housing section 54 and extends upwardly into the bottom section of the chamber 82. An electrical conductor 92 having a bifurcated upper end section is embedded in the housing section 54 and electrically couples chamber 84 with chamber 85. An electrical conductor 93 having a bifurcated upper end section is embedded in the housing section 54 and electrically couples the bottom of the chamber 86 with the bottom of the chamber 87. As shown in FIG. 2, six electrical conductors 94, 95, 96, 97, 98 and 99 are carried by the upper housing section 53 and extend down into the chambers 83 to 87 at selected elevations as will be described hereinafter in detail.

Positioned within each chamber 82 to 87 is a predetermined quantity of an electrically conductive liquid, such as mercury. An inert fluid, such as oil or glycerin is used to cover the mercury in each of the chambers to prevent the arcing of electrical current in air. The inert fluid reduces the oxidation of the mercury and minimizes the cavitation of the electrical conductors that are engageable with the mercury.

Figure 5:
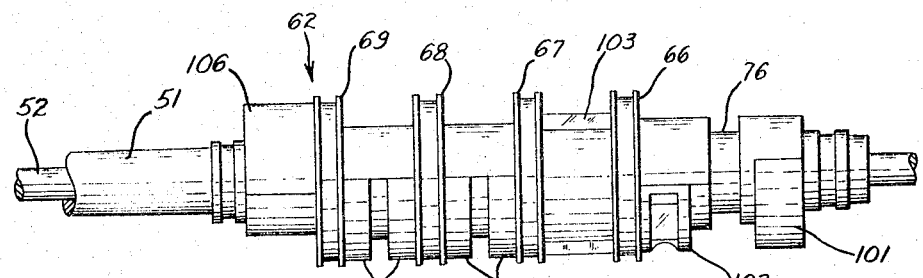
FIG. 5 is an enlarged side view of the rotatable member of the control assembly of FIG. 3.

The conductors 94 to 99 are electrically coupled by changing the elevation of the mercury in the chambers to place the mercury in physical contact with selected electrical conductors. The mercury in each of the chambers is positively displaced in the respective chambers by the sleeve 62. As shown in FIG. 5, the sleeve has enlarged arcuate sections 101, 102, 103, 104, 105 and 106. Each of these sections projects in a radial direction and is of a shape to displace a specific volume of mercury in response to indexed angular movements of the tubular shaft 51. The specific shape of the sections 106, 105, 103, 102, and 101 and their respective angular positions are illustrated in FIGS. 6 to 10.

Figure 8:
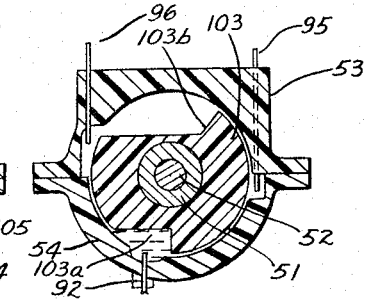
FIG. 8 is an enlarged sectional view taken along the line 8—8 of FIG. 2.
Figure 9:
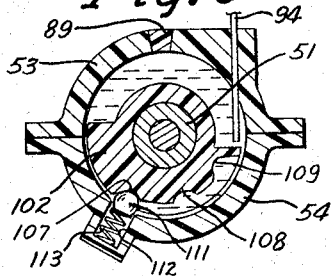
FIG. 9 is an enlarged sectional view taken along the line 9—9 of FIG. 2.

Referring to FIG. 9, it is seen that the sleeve 62 has three indexed positions determined by recesses 107, 108 and 109 in the periphery of the arcuate section 102. These positions are the park position, the low speed position and the high speed position. The sleeve 62 in FIGS. 5 to 10 is shown in the park position.

Figure 6:
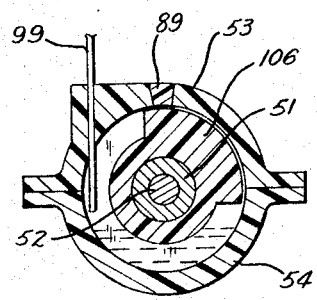
FIG. 6 is an enlarged sectional view taken along the line 6—6 of FIG. 2.

As shown in FIG. 6, the sleeve section 106 has an arcuate length of about 105° and is positioned adjacent the upper housing section 53. Rotation of the sleeve 62 to the low speed and high speed positions progressively moves the section 106 into the mercury raising the level thereof.

Figure 7:
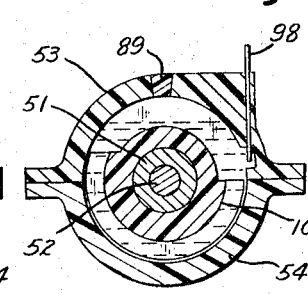
FIG. 7 is an enlarged sectional view taken along the line 7—7 of FIG. 2.

The sleeve section 105 shown in FIG. 7 has an arcuate length of about 195° and is positioned adjacent the lower housing section 54. The peripheral wall of section 105 is divided with a groove providing space for the mercury in chamber 86. Rotation of the sleeve 62 to the low speed and high speed positions progressively moves the section 105 out of the mercury lowering the level thereof. The arcuate section 104 is substantially identical to the arcuate section 105.

As shown in FIG. 8, the sleeve section 103 has an arcuate length of about 230° and is positioned adjacent the lower housing section 54. The lower portion of the section 103 has an L-shaped recess 103a spaced about 135° from the trailing edge 103b of the section. Rotation of the sleeve 62 to the low speed position moves the section 103 and positions recess 103a adjacent the end of the conductor 96 raising the level of the mercury in the chamber 84 so as to contact both conductors 95 and 96. The ends of the conductors 92, 95 and 96 are located in pockets open to the chamber 84 to provide proper contact area with the mercury and avoid interference with the sleeve 62.

When the sleeve 62 has been moved to the high position, the trailing edge 103b of the section 103 moves into the lower portion of the chamber 84 below the level of the end of the conductor 95 thereby increasing the mercury holding capacity of the lower area of the chamber 84. This results in lowering the level of the mercury in chamber 84 so as to move from conductor 96 and remain in contact with conductor 95.

Figure 10:
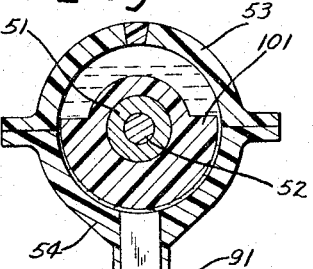
FIG. 10 is an enlarged sectional view taken along the line 10—10 of FIG. 2.
Figure 11:
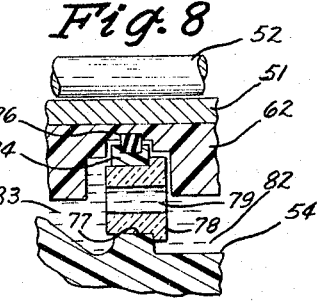
FIG. 11 is an enlarged sectional view of a part of FIG. 3 showing the circuit breaker for the control assembly.

The sections 102 and 101 shown in FIGS. 9 and 10 have arcuate lengths of about 180° and are positioned adjacent the lower housing section 54. On rotation of the sleeve 62 the arcuate sections 102 and 101 move out of the mercury in chambers 83 and 82 thereby progressively lowering the levels of the mercury in these chambers.

A detent comprising a ball 111 positioned in a bore 112 in the housing section 54 selectively coacts with the recesses 107, 108 and 109 in section 102 to hold the sleeve in one of the three indexed positions. A spring 113 is positioned in the bore 112 and engages the ball 111 biasing it into locking engagement with the sleeve 62.

As shown in FIG. 3, chambers 82 and 83 are electrically coupled through the mercury positioned in the bore 79 of the tubular member 78. This mercury has a known volume and functions as a circuit breaker when the current flow through the switch becomes excessive. An excessive amount of current flow through the mercury causes the mercury in the bore 79 to vaporize breaking the electrical connection between the chambers 82 and 83 thereby uncoupling the battery 41 which is connected to the electrical conductor 91 from the chambers 83 to 87 inclusive.

The circuit is re-established when the mercury from the chambers 82 and 83 flows into the bore 79 to reform a single mass equal to the known volume of the bore. The mercury flows into the bore 79 under the influence of gravity and the agitation and raising the hydrostatic head of the mercury in chambers 82 and 83. When the sleeve 62 is rotated from one indexed position to another mechanical vibrations are transferred to the mercury in the chambers 82 and 83 thereby aiding the return of mercury to the bore 79. If the current carrying capacity of the canal of mercury in the bore 79 is exceeded it will continue to function as a circuit breaker opening the circuit until the current is reduced to the carrying capacity of the mercury in the bore 79.

Figure 12:
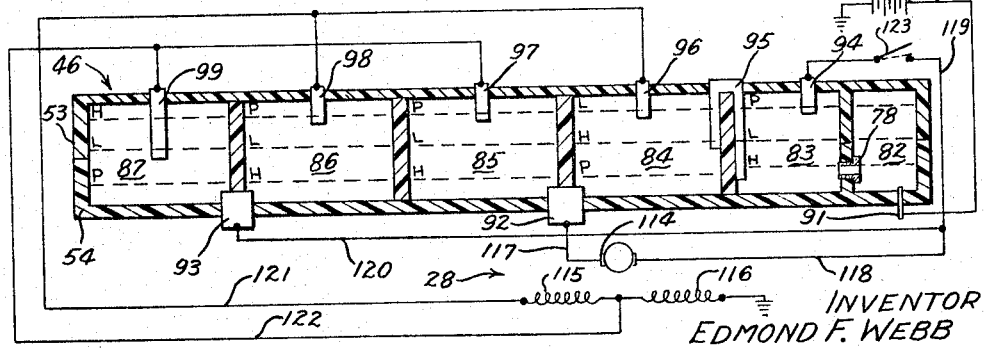
FIG. 12 is a schematic wiring diagram of the electric circuit for the windshield wiper motor.

Referring to the schematic electrical diagram in FIG. 12, the electric motor 28 is shown as having armature coils 114 and series connected field coils 115 and 116. Line 117 connects the electrical conductor 92 with one of the armature coils 114 and lines 118 and 119 connect the other armature coil with the electrical conductor 94. Interposed in the line 119 is a switch 123 which is normally closed and is held in an open position by the motion transmitting linkage 31 when the wiper element 26 is in the park position.

The electrical conductor 93 is coupled to the line 119 by a line 120. A line 121 is connected in series with the field coils 115 and 116 and the electrical conductors 96 and 98. A line 122 connects the field coil 116 to the electrical conductors 97 and 99.

The battery 41 is connected to the conductor 91 by the line 42. The mercury in the circuit breaker 78 electrically couples the chamber 82 with the chamber 83 and the electrical conductor 95 electrically couples the chambers 83 and 84.

The level of the mercury in each of the chambers 82 to 87 is illustrated by broken lines for the three indexed positions of the sleeve 62 which represent the park condition P, the low speed condition L and the high speed condition H of the electric motor 28. The mercury level in the respective chambers 82 to 87 is determined by the indexed position of the enlarged arcuate sections 101 to 106 of the sleeve 62 relative to the level of the mercury in the chambers.

When the sleeve 62 is indexed in the park position as shown in FIG. 3, the mercury in chamber 83 is in contact with the electrical conductors 94 and 95 and the mercury in chambers 85 and 86 is in contact with the electrical conductors 97 and 98, respectively. As shown in FIG. 12, the electrical conductor 92 is always in contact with the mercury chambers 84 and 85 and the conductor 93 is always in contact with the mercury in chambers 86 and 87.

On movement of the wiper blade elements 26 to the park position current from the battery flows through the mercury chamber 83 and through the line 119, the closed switch 123 and the line 118 to the armature coils 114 of the electric motor 28. From the armature coils 114 the current flows through the line 117 to the electrical conductor 92. The mercury of the chamber 85 being in contact with both the electrical conductor 92 and the electrical conductor 97 transmits current to the line 122 which directs the current to the field coil 116 which is connected to ground. When the wiper blade has been moved to the park position the switch 123 is opened by the motion transmitting linkage 131 thereby breaking the circuit for the electric motor 28.

When the sleeve 62 has been indexed to the low operating speed position L the level of the mercury in chamber 84 has been raised into engagement with the electrical conductor 96 and the mercury level in chamber 87 has been raised into contact with the electrical conductor 99. The mercury level in chambers 83, 85 and 86 has been lowered out of contact with the conductors 94, 97 and 98, respectively. Conductor 95 electrically connects chambers 83 and 84. The mercury in chamber 84 electrically couples the electrical conductors 92, 95, and 96 carrying the current to the line 117 which is connected in series to the armature coils 114. Line 121 carries current from the conductor 96 to field coils 115 and 116. Lines 118 and 120 carry the current from the armature coils to the electrical conductor 93. The mercury in chamber 87 electrically couples the electrical conductor 93 with the electrical conductor 99. Line 122 carries the current from the conductor 99 to the field coil 116 connected to ground. The switch 123 closes as soon as the wiper element is moved from the park position.

On movement of the sleeve 62 to the high position H the arcuate sections 101 and 106 change the level of the mercury of the respective chambers such that in chamber 84 the mercury is only in contact with the conductor elements 92 and 95 and the mercury in chamber 87 is in contact with the conductor elements 93 and 99. The current from the battery 41 flows via mercury in chambers 82 and 83 and conductor 95 to the mercury in the chamber 84. Conductor 92 and line 117 carry current to the armature coils 114. The lines 118 and 120 transmit the current from the coils 114 to the electrical conductor 93 which is in contact with the mercury in chamber 87. The electrical conductor 99 being in contact with the mercury in chamber 87 and the line 122 completes the circuit to the motor field coil 116 connected to ground. The sleeve 62 can be indexed back to the low position L or park position P which changes the levels of the mercury in the respective chambers effecting the switching of the circuit to drive the electric motor 28 respectively at a slower rate of speed or in a reverse direction to effect park position of the wiper elements 26.

Figure 4:
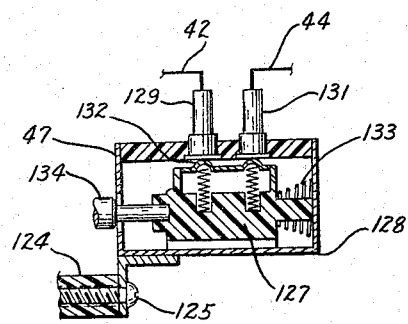
FIG. 4 is an enlarged sectional view taken along the line 4—4 of FIG. 2.

As illustrated in FIG. 3, the housing section 54 of the first switch unit 46 has a forwardly extended boss 124 having a threaded bore 126. A screw 125 threaded into the bore 126 attaches the second switch unit 47 to the boss 124 (FIG. 4).

The second switch unit 47 has a contact carrier 127 slidably disposed in a casing 128. The top wall of the casing has a pair of spaced stationary electrical contacts 129 and 131 which are in alignment and engageable with a movable electrical contact 132 carried by the carrier 127. A coil spring 133 is interposed between the carrier 127 and the end wall of the casing 126 and functions to bias the carrier toward the first switch unit 46. The line 42 from the battery is connected to the stationary conductor 129 and the line 44 is connected to the stationary electrical contact 131. Movement of the carrier 127 against the biasing force of the spring 133 positions the electrical contact 132 in engagement with both stationary contacts 129 and 131 thereby connecting the battery 41 to the wiper motor 36.

As illustrated in FIG. 2, the rod 52 has an enlarged end 134 which engages the carrier 127. When a pushing force is applied to the button 49, the rod 52 is linearly moved in the sleeve 51 urging the head 134 into engagement with the carrier 127. The rod 52 and carrier 127 move as a unit against the biasing force of the coil spring 133 positioning the second switch in an on position as shown in FIG. 4. When the force on the button 49 has been released the coil spring 133 moves the carrier and the rod 52 back to their initial positions. A collar 135 secured to the rod 52 adjacent the head 134 engages the end of the shaft 51 and functions as a stop for the rod 52.

In summary, it is seen that the control assembly 24 has a first switch unit 46 which is operable to connect and disconnect the battery 41 and the wiper electric motor 28, and a second switch unit 47 which is operable to connect and disconnect the battery 41 with the washer electric motor 36. The first switch unit 46 includes a housing which is divided into a series of separate tandem chambers by a rotatable member or sleeve 62. A measured amount of electrical conducting liquid, such as mercury, is stored in each of the chambers and engages a portion of the rotatable member. Electrical conductors are attached to the housing and open into the chambers at different levels as illustrated in FIG. 12. The rotatable member is indexed in three positions and functions to positively displace the mercury into and out of physical contact with selected electrical conductors thereby effecting electrical switching operations controlling the speed and direction of rotation of the motor drive shaft 29.

Although a preferred embodiment of the invention has been disclosed and described, it is not to be so limited, as alterations and modifications may be had within the full scope of the invention as defined in the appended claims.

I claim:
1. An electric switch comprising:
   (a) a stationary housing of insulating material having a bore,
   (b) sleeve means of insulating material positioned in said bore and rotatably mounted on said housing, said sleeve means having first portions dividing the bore into a plurality of separate chambers,
   (c) an electrically conductive liquid positioned in and partially filling each of said chambers,
   (d) an inert fluid in said chambers,
   (e) electrical conductors mounted in said housing and projected into selected chambers,
   (f) second portions on said sleeve means operative to displace said conductive liquid in response to rotation of the sleeve means relative to the housing into engagement with certain of said electrical conductors, and
   (g) means coacting with the sleeve means and housing to hold the sleeve means in indexed positions relative to the housing means.
2. An electric switch comprising:
   (a) a stationary housing of insulating material having a bore,
   (b) sleeve means of insulating material positioned in said bore and rotatably mounted on said housing, said sleeve means having first portions dividing the bore into a plurality of separate chambers,
   (c) an electrically conductive liquid positioned in and partially filling each of said chambers,
   (d) electrical conductors mounted in said housing and projected into selected chambers, at least one of said conductors positioned out of engagement with said liquid, and
   (e) second portions on said sleeve means operative to displace said conductive liquid in response to rotation of the sleeve means relative to the housing into engagement with certain of said electrical conductors.
3. An electric switch comprising:
   (a) a stationary housing of insulating material having a bore,
   (b) sleeve means of insulating material positioned in said bore, said sleeve means dividing the bore into a plurality of separate chambers,
   (c) means coacting with said sleeve means and housing for rotatably mounting the sleeve means on the housing,
   (d) electrical conductors mounted in said housing and projected into selected chambers,
   (e) an electrically conductive liquid positioned in each of said chambers, and
   (f) means on said sleeve operative to displace said liquid in response to rotation of the sleeve means relative to the housing into engagement with selected ones of said electrical conductors.

References Cited by the Examiner

UNITED STATES PATENTS 1,160,608  11/1915  Hubbard _____ 200—112.2 X

ROBERT K. SCHAEFER, *Primary Examiner.*